United States Patent Office 2,882,168
Patented Apr. 14, 1959

2,882,168
METHOD OF MAKING A CHEESE FLAVORED SALAD DRESSING

Anthony J. Rossi, Chicago, Ill.

No Drawing. Application December 20, 1955
Serial No. 554,140

15 Claims. (Cl. 99—144)

This invention relates to a cheese product, and method of making the same, and more particularly, to a stable food emulsion containing cheese, and the process of making the same.

The demand for cheese flavored products has recently brought about the wide distribution of a number of such products in the form of salad dressings, cheese spreads, and the like. In general, the cheese in these products is finely ground and then blended into more or less standard products of this type. However, this type of compounding operation has not resulted in altogether satisfactory dispersion of the cheese in the product so as to obtain the full benefit of the flavor thereof; nor has it resulted in satisfactory stability in the particular product, since the cheese particles tend to settle out on standing (because the suspension is unstable).

Most of the typical food products of this character are food emulsions, and one of the most common and well known food emulsions is mayonnaise. Mayonnaise is a characteristic edible emulsion, consisting of a dispersed phase of vegetable oil, a continuous water phase, suitable flavoring materials, and emulsifying agents in the form of egg yolk, mustard and vinegar (acetic acid). It is understood that the central emulsifying agent is the egg yolk which contains lecithin, although the powdered mustard has certain specific functions in connection with the use of hard water in mayonnaise preparation. Salad dressing is essentially a mayonnaise-base food emulsion, which contains an appreciable amount of cooked starch functioning as a thickening or bodying agent. French dressing is a more or less unstable type of food emulsion wherein the vegetable oil is dispersed in the continuous aqueous phase principally by virtue of the emulsifying action of certain tomato extracts.

In each of these various food emulsions, cheese flavoring has been added heretofore principally in the form of comminuted cheese either in powdered or grated form which is blended with the food emulsion. The net result is, of course, a cheese flavoring which is affected by the principal or basic flavoring of the particular food emulsion, and also a cheese product wherein the dispersion of the cheese does not remain stable and the cheese tends to settle out.

The instant invention results from a discovery of a food product, wherein the cheese produces its own central emulsifying agent in a food emulsion, thereby to provide a stable end product.

It is, therefore, an important object of the instant invention to provide an improved cheese product, and an improved method of making the same.

It is a further object of the instant invention to provide an improved cheese emulsion, wherein the principal flavoring ingredient is the cheese itself, which effectively participates as an emulsifying agent in the food product so as to obtain a stable emulsion.

Yet another object of the instant invention is to provide an improved method whereby cheese may be processed to bring out its own whipping characteristics to make a food emulsion of the type particularly desirable as a dressing, spread or the like food.

A further object of the instant invention is to provide an improved method of preparing a cheese product, that comprises fluidizing cheese by exposing the cheese to non-evaporative pasteurization conditions, and blending oil and dilute aqueous acetic acid with the fluidized cheese to form an emulsion.

Yet a further object of the instant invention is to provide an improved method of preparing a cheese product, that comprises fluidizing cheese by exposing the cheese to non-evaporative pasteurization conditions, and blending with a fluid milk product to form an emulsion, followed by blending with oil.

Other objects, features and advantages of the present invention will be obvious to those skilled in the art from the following detailed disclosure of specific embodiments thereof.

In one of its more specific aspects, the instant invention consists in a method of preparing cheese-flavored mayonnaise, that comprises subjecting processed cheese to non-evaporative pasteurization conditions to fluidize the cheese; blending therewith, on the basis of 100 parts of fluidized cheese, 30 parts of vinegar and 40 parts of cottonseed oil to emulsify the resulting mixture; cooling to 60° F.; then whipping into the mixture 30 parts of vinegar, 40 parts of cottonseed oil, 40 parts of sharp natural cheese finely divided, 8 parts of corn syrup, and small amounts of flavoring and spices; and then, after cooling to storage temperatures, whipping 100 parts of milk thereinto with an inert gas.

In another specific aspect, the instant invention consists in a method of preparing a cheese-flavored product, that comprises subjecting natural cheese to non-evaporative pasteurization conditions to fluidize the cheese; blending with each 100 parts of fluidized cheese 20–40 parts of milk thickened with milk powder and 30–50 parts of vegetable oil, while maintaining the blend warm to effect the formation of an emulsion, then cooling the emulsion to 40–80° F., and whipping thereinto from ½ to 2 times the amounts of milk and oil previously blended therewith.

The invention may be demonstrated specifically by carrying out the following procedure:

A charge of 2 pounds of aged Swiss cheese and 4.15 pounds of white Cheddar for manufacture, plus 0.25 pound of disodium phosphate is heated with direct steam for 30 minutes to a temperature of not less than 150° F. to obtain non-evaporative pasteurization conditions, whereby the cheese is effectively fluidized, or reduced to a substantially fluid molten blend of the two cheese ingredients. Before appreciable cooling takes place, a small amount of 3% acetic acid vinegar, such as 0.5 pound, is added to the fluidized cheese, and this addition is followed by an addition of an equal amount of edible vegetable (cottonseed) oil, during continuous blending of the charge by means of reasonably rapid stirring. If the addition of the oil does not effect emulsion formation, the application of a slight amount of additional heat to return the charge temperature to approximately the pasteurization temperature effects the formation of the emulsion; and a total of 1.8 pounds (minus the 0.5 pound initial addition) of 3% acetic acid vinegar and 2.45 pounds (minus the initial 0.5 pound addition) of vegetable oil are then flowed slowly into the charge with continuous stirring, so as not to break the emulsion, and the resulting emulsion is permitted to cool.

After the emulsion has cooled to 60° F., the following ingredients are whipped into the emulsion by rapid stirring or by the use of or in the presence of an inert gas (such as air nitrogen or carbon dioxide):

1.8 pounds of 3% acetic acid vinegar,
2.45 pounds of cottonseed oil,
2.25 pounds of Roquefort cheese (in finely divided form),
0.5 pound corn syrup, and flavoring and spices to suit (including salt, pepper, sugar, paprika, and/or mustard flour).

It has also been found that the use of corn syrup may be avoided in the above formula so as to obtain superior stability; but the invention offers the advantage that corn syrup may be used to obtain good results.

The resulting material is then stored under ordinary storage (refrigeration) conditions, principally for the purpose of cooling the emulsion down to standard storage conditions, and then 6.4 pounds of milk is whipped into the emulsion, by means of an inert gas or by mechanical beaters, in order to obtain a stable food emulsion resembling in appearance and texture a typical mayonnaise product, but having the distinct and undiluted taste of the desired combination of cheeses here used. The resulting product has been found to have unique stability, with respect to the Swiss and Cheddar cheeses initially employed in preparing the emulsion as well as the granulated Roquefort cheese subsequently added.

As another demonstration of the invention, a charge of 4 pounds of natural Swiss cheese is heated with direct steam for 30 minutes to a temperature of not less than 150° F. to obtain non-evaporative pasteurization conditions, whereby the cheese is effectively fluidized, or reduced to a substantially fluid molten cheese product. Before appreciable cooling takes place, a small portion of a milk product, such as 0.5 pound, is added to the fluidized cheese. The total portion of milk product is prepared by admixing 1.25 pounds of fluid milk with 0.75 pound of skim milk powder to obtain a thickened milk product and, as just indicated, about 0.5 pound of the resulting 2 pounds of milk product is added initially; and this addition is followed by an addition of an equal amount of edible vegetable (cottonseed) oil, during continuous blending of the charge by means of reasonably rapid stirring. If the addition of the oil does not effect emulsion formation, the application of a slight amount of additional heat to return the charge temperature to approximately pasteurization temperature effects the formation of the emulsion; and a total of 2 pounds (minus the 0.5 pound initial addition) of the milk product and a total of 3.25 pounds (minus the initial 0.5 pound addition) of vegetable oil are then flowed slowly into the charge with continuous stirring, so as not to break the emulsion, and the resulting emulsion is permitted to cool.

After the emulsion has cooled to 60° F., 0.75 pound of Roquefort cheese (in finely divided form) plus spices to flavor are whipped into the emulsion by rapid stirring and the resulting material is then stored under ordinary storage (refrigeration) conditions. An additional quantity of milk, such as 4 pounds of milk, may be whipped into the emulsion, by means of an inert gas or by mechanical beaters, in order to obtain a more fluid stable food emulsion resembling in appearance and texture a typical mayonnaise product, but having the distinct and undiluted taste of the desired combination of cheeses here used. The resulting product has unique stability, not only with respect to the Swiss cheese employed in the original charge but also with respect to the granulated Roquefort cheese subsequently added.

The procedure just described may be carried out with slight variations to obtain a comparable product. For example, the fluidized Swiss cheese may be maintained at 150–160° F. for five to ten minutes while the entire 2 pounds of milk product plus about 0.5 pound of oil are blended thereinto; and the Roquefort cheese may then be added with low speed blending, followed by the addition of the remainder of the oil at high speed blending.

As is well known, there are many different kinds of cheeses, which have been classified in several different manners. In general, cheese consists of the essential food nutrients of milk, which have been collected into a coagulum or curd, either by natural souring or by the addition of rennet, and separated from the whey or watery portion of the milk. In making most forms of cheese, the coagulum is subjected to the curing action of various molds or bacteria so as to develop characteristic flavors. The reaction of such molds or bacteria may be altered or retarded by salting of the cheese or by pasteurization. In general, the unpasteurized cheeses are referred to as natural cheese, whereas subsequently treated cheeses obtained by the flavoring, melting and/or pasteurizing of one or more cheeses are usually known as "processed cheese." The natural cheeses include soft cheeses (generally those made by souring milk with lactic acid), hard cheeses (those made by coagulating with rennet, cooking and pressing the coagulum or curd, and ripening with molds or bacteria for at least several months), and semi-hard cheeses which are made by processes falling between the processes used for the other two types.

In the instant invention, it has been found most preferable to employ processed cheese (when vinegar is used), since the initial step in the instant process involves the use of the pasteurization conditions ordinarily used in manufacturing processed cheese. The "processed cheese" thus used in the instant invention may be the fluidized cheese which has just been subjected to initial pasteurization conditions in the ordinary manufacture of process cheese, or it may be a processed cheese which has been carried through the entire procedure including pasteurization and subsequent casting into forms and cooling.

As will be appreciated, almost any type of natural cheese may be employed in the manufacture of processed cheese, although certain cheeses of particularly distinctive taste or made from certain specific ripening procedures are not used ordinarily in the manufacture of processed cheese, because the distinctive tastes thereof may be altered or substantially lost by the procedures employed in making processed cheese. Thus, Roquefort cheese is more preferably added after the emulsification has taken place in the instant procedure, and the Roquefort cheese is thereby preferably not exposed to the pasteurization conditions. On the other hand, Cheddar cheese has been found to be particularly suitable for use in the initial process steps of the invention (i.e. hard or semi-hard cheese).

In the instant invention, it has been found preferable to employ natural cheese, however, when the milk product is used rather than vinegar as the emulsifying agent for initial coaction with the cheese. For want of a better term, the vinegar and the milk product are both referred to hereinafter as the "emulsifying agent" for this invention. Although it is not desired to limit the invention to any particular theory, it is believed that the heating of the milk with the cheese results in a release of lactic acid (or closely related compound functionally similar) which may thus cooperate with the cheese in the same manner that the acetic acid of vinegar apparently cooperates. The precise manner in which this cooperation is accomplished is not understood, but it is known that acetic acid and lactic acid have similar properties and are related. Lactic acid is present in the milk to a small extent in fresh milk and to an increasingly greater extent in milk which is heated or which has started to sour. If the procedure described in the first demonstration is carried out except that a lactic acid solution comparable in strength to the acetic acid solution of vinegar is employed, a stable product results.

As has been explained, an important initial step in the instant process involves fluidizing cheese by exposing the cheese to non-evaporative pasteurization conditions. As will be appreciated, the "non-evaporative" conditions require the presence of a sufficient amount of moisture in the atmosphere to prevent loss of moisture by the cheese during the heating process connected with pasteurization. Most preferably, the cheese is fluidized by heating in the presence of steam for ¼ to ¾ hour (about ½ hour on the average) at pasteurization temperatures. The pasteurization temperatures used will depend to a certain extent upon the particular type of cheese employed, but, in general, the pasteurization temperatures will fall within the range of about 150–180° F., and at least a temperature of 150° F. should be used. This results in melting or fluidizing of the cheese to the extent that it may be suitably stirred or agitated for blending purposes.

An important key to the instant invention resides in the step of blending the hot fluidized cheese with certain other ingredients, which include the emulsifying agent and oil. As is well known, vinegar is essentially dilute aqueous acetic acid, and it will be recognized that such a dilute solution of acetic or lactic acid might be substituted for vinegar in the instant process, although vinegar (containing the usual impurities of sugar, phosphates, etc.) is the standard ingredient for addition to mayonnaise, dressing, or spread compositions of the instant type. In general, vinegar contains about 3–6 weight percent of acetic acid, and it has been found most preferable to use approximately 3% acetic acid cider vinegar in the instant process.

Although the emulsifying agent used may be fluid milk, it is generally preferable to employ a thickened milk product which contains milk powder. In this respect, the milk employed may contain from 0% to about 100% of its weight of milk powder, but preferably a thickened milk product is employed wherein the milk contains from 40 to 80% of its weight of milk powder.

The oil used is, of course, an edible oil which includes even certain mineral oils in some non-fattening types of salads, but generally such edible oils are the so-called salad oils, which are vegetable oils and the most common of which is cottonseed oil. In general, the oil has the characteristic of being immisible in water and suitably compatible with the formation of a stable emulsion in the instant composition, and cottonseed oil has been found to be most preferable. (In the milk formulation, small amounts, i.e. about 1% of emulsifiers such as lecithin may be used to advantage in the oil.)

As has been explained, a key to the instant inventive concept resides in the addition of the vinegar and the oil to the cheese while in the fluidized state resulting from subjection to the pasteurization conditions. The oil and emulsifying agent may, of course, be added simultaneously; but it has been found to be particularly desirable to add the emulsifying agent first in a small amount and then add a small amount of the oil. This procedure is employed because it apparently results in the formation of a much more stable and satisfactory emulsion. As was indicated in the aforementioned demonstrations, a small amount of the emulsifying agent is first added to the fluidized cheese and this apparently results in the formation of a particularly suitable emulsion.

Although it is not desired to limit the instant invention to any particular theory, it is believed that a compound or chemical complex of some sort is formed between a portion at least of the cheese and the acetic acid of the vinegar or lactic acid of the milk, so as to obtain a uniquely satisfactory emulsifying complex, which is capable of effectively retaining all of the cheese initially used (as well as some subsequently added) in emulsion. Whatever phenomena may be involved, it is clear that some sort of cooperation between the vinegar or milk and the fluidized cheese is effected as a result of combining these ingredients at the relatively high temperatures ordinarily used for pasteurization. A slightly lower temperature may be used, during the ordinary course of cooling of the fluidized cheese, but often the emulsion does not tend to form as rapidly (which is particularly noticeable upon the addition of the oil) and it may be necessary to re-heat the mixture slightly in order to accelerate the suitable formation of the emulsion. The formation of the emulsion will, of course, be evident to those skilled in the art; and those skilled in the art recognize that certain conditions such as moderately rapid mixing or blending are conducive to suitable emulsion formation, whereas certain other conditions of a more drastic nature such as excessive heating and/or excessively violent agitation are not conducive to emulsion formation.

In general, about 10–50 parts of vinegar and about 20–100 parts of oil are added to the fluidized cheese before cooling thereof. Most preferably, on the basis of 100 parts of fluidized cheese, the amount of vinegar added is about 20–40 parts (best results being obtained with 30 parts) and the amount of vegetable oil added is about 30–50 parts (best results being obtained with 40 parts). During such addition, which preferably involves the addition of at least part of the vinegar first, the fluidized cheese is maintained warm and suitable blending or stirring is continuously carried out.

During this initial step, it is generally preferable to add approximately ½ of the vinegar and ½ of the oil which will ultimately be employed, because this amount of each is usually sufficient to effectively form the desired emulsion, which remains stable during subsequent treatment. Actually, the amount of vinegar and/or oil initially used may be such that from ½ to twice that amount may be subsequently added, or even a greater variation may be employed between the amounts initially and subsequently added of each, if such is desired.

In general, the amount of the milk product used is the same as the amount of vinegar used in the practice of the instant invention, although good results can be obtained adding the entire amount of the milk product during the initial step. The amount of oil is preferably also the same, but the oil addition is similar to that using the vinegar in the initial and in subsequent steps.

The product thus obtained, as a result of the initial emulsion formation, is a stable cheese-flavored food emulsion consisting essentially of a dispersed phase of vegetable oil, a continuous phase of water, and emulsifying agents comprising essentially processed cheese and acetic or lactic acid. As previously mentioned, it is believed that at least some of the processed cheese and acetic or lactic acid are in combined or loosely connected form, although the presence of each is identifiable as individual ingredients. This food emulsion is a suitable base material which may be used in the preparation of mayonnaise, salad dressing, French dressing, cheese spreads, etc. It is unique in that the cheese (combined with acetic acid or lactic acid) provides the emulsifying effect.

In order to complete the preparation of a suitable mayonnaise-like food product, additional vinegar and vegetable oil are added to the vinegar product after the emulsion has been permitted to cool to about 40–80° F. Preferably the cooling is carried out at least to about 60–70° F.; and the vinegar and vegetable oil are whipped into the emulsion, by the use of inert gas and/or mechanical agitation most preferably. In any event, the whipping or blending operation is carried out so as not to destroy the initially formed emulsion.

The amount of vinegar and the amount of vegetable oil added is, of course, in each case, an amount sufficient to obtain the desired flavoring effect, consistency, etc. Preferably, it is, in each case, from ½ to 2 times the amount employed in the initial emulsification step, and most preferably it is substantially equal to the amount employed in the initial emulsification step. After this whipping operation has been completed, the material is ready for storage, and is stored in the ordinary manner for mayonnaise compositions, under refrigeration conditions.

During the addition of vinegar and oil by means of the whipping operation, it is also desirable to add those other flavoring ingredients which are employed in the particular composition desired. For example, in the simulated mayonnaise composition, about 2–20 parts (per 100 parts of initial fluidized cheese) of corn syrup may be added (and most preferably about 5–10 parts should be added if it is desired to add any corn syrup). Most preferably corn syrup is not used for best physical results. Also, various small amounts of flavoring and spices including sugar, salt, mustard flour, paprika, and pepper may be added to suit the taste. As has been previously explained, the mustard flour is understood to carry out an additional function as an emulsifying agent or at least an emulsification stabilizer, and it is preferred to add the mustard flour in small amounts (about 5–10 parts, and preferably about 7 parts per 100 parts of fluidized cheese).

As has also been pointed out, additional cheese in granulated form may be dispersed in the instant emulsion (from either milk or vinegar base) during the subsequent whipping operation, although the amount of additional cheese should not exceed the amount of fluidized cheese initially employed. If it is desired to add additional cheese during the whipping operation, the amount added is preferably about 30–50 parts (per 100 parts of fluidized cheese). The types of cheese which may be added advantageously during the whipping operation include certain natural cheeses which may not be favorably affected by a pasteurizing process or which may have sharp distinctive tastes which are altered by a pasteurizing process. In such instances, it is usually advantageous to add these cheeses during the whipping operation. It will be appreciated, however, that any of the known cheeses may be subjected to the pasteurization and fluidizing operation of the instant invention so as to actively participate in the emulsification operation. The only reason for adding cheeses subsequently is for the purpose of obtaining a particular type of flavor.

After the material (i.e. either the milk base or vinegar base emulsion) has been whipped to a cream-like consistency (the consistency of whipped cream, for example), and the material is suitably placed in storage, under refrigeration conditions, it is preferable to carry out an additional processing step which involves whipping milk (or in the case of non-fattening compositions perhaps water) into the material. If milk is used, it is preferable to have reduced the material to approximately refrigeration conditions, so as to reduce the tendency to cause souring of the milk; and the milk is whipped into the composition in amounts ranging from 50 to 200 parts, and preferably about 100 parts per 100 parts of fluidized cheese initially employed. The product thus obtained by whipping 100 parts of milk into the previously formed blend, as described hereinbefore in the initial demonstration, is found to have a particularly delicious taste, having a true cheese flavor unadulterated by other typical dressing or mayonnaise flavoring ingredients, and the product is also found to have unusual stability during storage.

Another particularly important aspect of the instant invention resides in several superior properties of the initial emulsion obtained at substantially pasteurization temperatures. This emulsion consists essentially of a dispersed phase of vegetable oil, a continuous phase of water and emulsifying agents comprising processed cheese and acetic or lactic acid. This emulsion is uniquely superior in particular in respect to its heat resistance. For example, mayonnaise compositions made using egg in place of the emulsifying agent cannot withstand cooking temperatures for any appreciable period of time without causing cooking of the egg so as to destroy the texture of the composition. In contrast, the instant emulsion can withstand these higher temperatures and advantage may be taken of this fact in blending or compounding the instant emulsion with certain other ingredients.

For example, a salad dressing may be prepared by carrying out the preliminary steps of adding cold water to a suitable starch base (e.g. about 20 parts of tapioca flour and 90 parts of corn starch), cooking the material to about 180–190° F. (until the material starts to stiffen) and then stirring and cooling the material to about 120° F. The initial emulsion obtained at pasteurization conditions hereinbefore described (i.e. 100 parts of fluidized cheese, 30 parts of vinegar or milk and 40 parts of cottonseed oil) may then be blended with the cooked starch, and the materials are blended together and cooled to at least about 60° F.; and then the remaining vinegar or milk, vegetable oil, flavoring and spices which are to be added may be whipped into the material so as to obtain a particularly delicious as well as stable salad dressing.

A French dressing may be prepared in a similar manner, by blending the above described initial fluidized cheese emulsion with the tomato flavoring and spices ordinarily employed in French dressing. The resulting product has a reddish-white color to it, as contrasted to many French dressings which possess a more or less clear or translucent red appearance (although certain emulsified or whitened French dressings are also available). The ratio used is preferably, on the basis of 100 parts of fluidized cheese, 50 to 200 parts of French dressing (per se) and most preferably 100 parts. (All parts and percents herein being by weight, unless otherwise designated.)

Other compositions which may be used, or formulations which have been found to be particularly satisfactory include the following:

Formulation A:

| Ingredient | Unit | Amount |
| --- | --- | --- |
| Fluidized Cheddar cheese | lb | 15 |
| Sugar | lb | 3 |
| Mustard flour | lb | 1¼ |
| Salt | lb | 1 |
| Paprika | lb | ¾ |
| Pepper (white) | oz | 1 |
| Oil (salad) | gal | 12 |
| Vinegar (100 grain, white) | qt | 4 |
| Water | qt | 2 |

Formulation B:

| Ingredient | Unit | Amount |
| --- | --- | --- |
| ½ Cheddar–½ Swiss cheese | lb | 5 |
| Oil | gal | 2¼ |
| Vinegar (45 grain) | qt | 1¼ |
| Sugar | oz | 10 |
| Mustard flour | oz | 4 |
| Salt | oz | 6 |
| White pepper | oz | ½ |
| Paprika | oz | ½ |

Formulation C:

| Ingredient | Unit | Amount |
| --- | --- | --- |
| American brick cheese | g | 120 |
| Cottonseed oil | cc | 330 |
| Spice and salt mixture | g | 24 |
| Cider vinegar (45 grain) | cc | 160 |
| Monochloracetic acid | cc | ¼ |

Formulation D:

| Ingredient | Unit | Amount |
| --- | --- | --- |
| ½ Cheddar–½ cottage cheese | g | 340 |
| Vinegar | cc | 320 |
| Water | cc | 80 |
| Salt | g | 44 |
| Sugar | g | 40 |
| Mustard | g | 16 |
| Oil | cc | 3160 |

Formulation E:

| Ingredient | Unit | Amount |
| --- | --- | --- |
| Oil | cc | 1420 |
| Cheddar cheese | g | 200 |
| Vinegar (6% solution) | cc | 174 |
| Mustard | g | 20 |
| Salt | g | 15 |
| Sugar | g | 50 |
| Water | cc | 121 |

Formulation F:

| | | |
|---|---|---|
| Corn starch | g | 90.0 |
| Tapioca flour | g | 20.0 |
| Sugar | g | 152.0 |
| Vinegar | g | 152.0 |
| Salt | g | 31.0 |
| Mustard | g | 12.5 |
| Pepper | g | 3.0 |
| Cheddar cheese | g | 100.0 |
| Water | cc | 455.0 |
| Cottonseed oil | cc | 830.0 |

Add cold water to the starch and flour, heat to 184° F., and mix until it cools to 120° F.; prepare initial emulsion of cheese plus 50 g. of vinegar and 50 cc. of cottonseed oil; then blend cooked starch therewith, and then whip remaining ingredients thereinto.

Formulation G (using the same procedure as for the above salad dressing):

| | | |
|---|---|---|
| Corn starch | g | 110.0 |
| Tapioca flour | g | 25.0 |
| Sugar | g | 152.0 |
| Vinegar | g | 152.0 |
| Salt | g | 31.0 |
| Mustard | g | 12.5 |
| Pepper | g | 3.0 |
| Cheddar cheese | g | 125.0 |
| Water | cc | 740.0 |
| Cottonseed oil | cc | 700.0 |

Formulation H:

| | | |
|---|---|---|
| Natural Swiss cheese | g | 400 |
| Fluid fresh milk | cc | 150 |
| Skim milk powder | g | 50 |
| Salad oil (containing 1% lecithin) | cc | 350 |
| Spice and salt mixture | g | 24 |
| Sugar | g | 20 |

Formulation J:

| | | |
|---|---|---|
| Natural Swiss cheese | g | 1000 |
| Fluid fresh milk | cc | 300 |
| Skim milk powder | g | 200 |
| Salad oil (containing 1% lecithin) | cc | 1000 |
| Spice and salt mixture | g | 50 |
| Sugar | g | 40 |
| Roquefort cheese | g | 200 |

It will also be appreciated that egg or only the egg yolk may be included in the instant formulations, notwithstanding the fact that the instant invention provides an additional advantage in that it avoids the necessity of using compounding conditions that are not designed to prevent cooking of the eggs which might be present. In other words, a portion of the cheese employed in each of the above identified formulations of, perhaps, up to 50% may be replaced by egg yolk. In such circumstances, the cheese emulsion is prepared as hereinbefore described, and the egg emulsion is prepared in the customary manner for the preparation of mayonnaise-type egg emulsions (at lower temperatures), and the two emulsions are blended together at low temperatures so as to avoid injury to the egg emulsion.

Modifications and alterations may be made without departing from the scope of the instant invention.

This is a continuation-in-part of my application Serial No. 346,015, filed March 31, 1953, now abandoned.

I claim as my invention:

1. A method of preparing a cheese product, that comprises fluidizing cheese by exposing the cheese to non-evaporative pasteurization conditions, and blending oil and dilute aqueous acetic acid with the fluidized cheese to form an emulsion.

2. A method of preparing a cheese product, that comprises fluidizing cheese by exposing the cheese to non-evaporative pasteurization conditions, blending vinegar with the fluidized cheese, and blending oil with the vinegar-fluidized cheese blend to form an emulsion.

3. A method of preparing a cheese product, that comprises heating processed cheese to 150–180° F. for ¼ to ¾ hour in the presence of steam to fluidize the cheese, blending vinegar therewith, blending vegetable oil therewith to effect emulsification, cooling the blend to 40–80° F., and then whipping additional vinegar and vegetable oil into the blend to obtain a whipped cream consistency.

4. A method of preparing a cheese product, that comprises blending 10–50 parts of vinegar with 100 parts of cheese fluidized by exposure to steam to heat the cheese to 150–180° F., and then blending 20–100 parts of vegetable oil therewith to obtain an emulsion.

5. A method of preparing a cheese product, that comprises fluidizing cheese by exposing the cheese to non-evaporative pasteurization conditions, and blending therewith, on the basis of 100 parts of fluidized cheese, 20–40 parts of vinegar and 30–50 parts of vegetable oil, while maintaining the blend warm to effect the formation of an emulsion.

6. A method of preparing a cheese product, that comprises fluidizing cheese by exposing the cheese to non-evaporative pasteurization conditions, blending therewith, on the basis of 100 parts of fluidized cheese, 20–40 parts of vinegar and 30–50 parts of vegetable oil, while maintaining the blend warm to effect the formulation of an emulsion, then cooling the emulsion to 40–80° F., and whipping thereinto from ½ to 2 times the amounts of vinegar and vegetable oil previously blended therewith.

7. A method of preparing a cheese product, that comprises fluidizing cheese by exposing the cheese to non-evaporative pasteurization conditions, blending therewith, on the basis of 100 parts of fluidized cheese, 20–40 parts of vinegar and 30–50 parts of vegetable oil, while maintaining the blend warm to effect the formulation of an emulsion, then cooling the emulsion to 40–80° F., whipping thereinto from ½ to 2 times the amounts of vinegar and vegetable oil previously blended therewith, and then whipping 50–200 parts of milk into the resulting product.

8. A method of preparing cheese-flavored mayonnaise, that comprises subjecting processed cheese to non-evaporative pasteurization conditions to fluidize the cheese; blending therewith, on the basis of 100 parts of fluidized cheese, 30 parts of vinegar and 40 parts of cottonseed oil to emulsify the resulting mixture; cooling to 60° F.; then whipping into the mixture 30 parts of vinegar, 40 parts of cottonseed oil, 40 parts of sharp natural cheese finely divided, 8 parts of corn syrup, and small amounts of flavoring and spices; and then, after cooling to storage temperatures, whipping 100 parts of milk thereinto with an inert gas.

9. A method of preparing cheese-flavored mayonnaise, that comprises exposing cheese to steam to obtain pasturization conditions and fluidize the cheese, blending with the fluidized cheese the amount ultimately desired as flavoring of vinegar and vegetable oil while heating the fluidized cheese sufficiently to effect emulsion formation then cooling at least to 60°–70° F., and next whipping the remainder of the vinegar and vegetable oil thereinto plus flavoring and spices.

10. A method of preparing cheese-flavored salad dressing, that comprises exposing cheese to steam to obtain pasteurization conditions and fluidize the cheese, and blending with the fluidized cheese the amount ultimately desired as flavoring of vinegar and vegetable oil while heating the fluidized cheese sufficiently to effect emulsion formation; adding cold water to starch base material, cooking to 180–190° F. and stirring until cooled to 120° F.; then admixing the emulsion with the cooked starch and blending together; then cooling at least to 60° F.; and next whipping the remainder of the vinegar and vegetable oil therein plus flavoring and spices.

11. A method of preparing a cheese product, that comprises fluidizing cheese by exposing the cheese to non-evaporative pasteurization conditions, and blending oil and a dilute aqueous solution of acid selected from the group consisting of acetic and lactic acids, with the fluidized cheese to form an emulsion.

12. A method of preparing a cheese product, that comprises fluidizing cheese by exposing the cheese to nonevaporative pasteurization conditions, and blending oil and milk with the fluidized cheese to form an emulsion.

13. A method of preparing a cheese-product, that comprises heating natural cheese to 150–180° F. for ¼ to ¾ hour in the presence of steam to fluidize the cheese, blending milk therewith, blending vegetable oil therewith to effect emulsification, cooling the blend to 40–80° F., and then whipping additional milk and vegetable oil into the blend to obtain a whipped cream consistency.

14. A method of preparing a cheese product, that comprises heating natural cheese to 150–180° F. for ¼ to ¾ hour in the presence of steam to fluidize the cheese, blending therewith fluid milk thickened with milk powder, blending vegetable oil therewith to effect emulsification, cooling the blend to 40–80° F., and then whipping additional milk and vegetable oil into the blend to obtain a whipped cream consistency.

15. A method of preparing a cheese product, that comprises fluidizing cheese by exposing the cheese to nonevaporative pasteurization conditions, blending with each 100 parts of fluidized cheese 20–40 parts of milk thickened with milk powder and 30–50 parts of vegetable oil, while maintaining the blend warm to effect the formulation of an emulsion, then cooling the emulsion to 40–80° F., and whipping thereinto from ½ to 2 times the amounts of milk and oil previously blended therewith.

References Cited in the file of this patent

UNITED STATES PATENTS

| | | |
|---|---|---|
| 65,494 | Livingston | June 4, 1867 |
| 2,015,258 | Clickner | Sept. 24, 1935 |
| 2,030,965 | Clickner | Feb. 18, 1936 |
| 2,317,958 | Ingle | Apr. 27, 1943 |
| 2,604,405 | Petersen | July 22, 1952 |
| 2,617,730 | Long et al. | Nov. 11, 1952 |
| 2,670,293 | Stark | Feb. 23, 1954 |

OTHER REFERENCES

"Everybody's Cookbook," by Lord, Harcourt, Brace and Company, New York, revised edition, pp. 671 and 672.